United States Patent [19]
Rist

[11] 3,712,436
[45] Jan. 23, 1973

[54] CLUTCH PLATE SPRING WITH PIVOT RINGS

[75] Inventor: Michel Theophile Rist, Boulogne, France

[73] Assignee: Societe Anonyme Francaise Du Ferodo, Paris, France

[22] Filed: Dec. 3, 1971

[21] Appl. No.: 204,624

[30] Foreign Application Priority Data

Dec. 11, 1970 France.................................7044667

[52] U.S. Cl...................................192/89 B, 267/161
[51] Int. Cl..............................................F16d 13/36
[58] Field of Search ..................192/89 B, 70.3, 99 A

[56] References Cited

UNITED STATES PATENTS 3,595,355  7/1971  Maucher..............................192/89 B

FOREIGN PATENTS OR APPLICATIONS 1,213,918  11/1970  Great Britain......................192/89 B Primary Examiner—Benjamin W. Wyche
Attorney—Irvin S. Thompson et al.

[57] ABSTRACT

A clutch of the kind comprising a diaphragm acting between a cover and a clamping-plate and rockably mounted on said cover by means of a plurality of small pillars fixed on said cover, in co-operation with supporting means extending, at least in part, over two circumferences enclosing all said pillars, one of said supporting means being mounted between the diaphragm and the cover while the other supporting means is a keeper-ring mounted on the other side of said diaphragm, in which said keeper-ring comprises at least one flattened portion adapted to co-operate with the head of an associated pillar, said flattened portion being limited circumferentially by lateral stop flanks which lock said keeper-ring against rotation. The device is intended to prevent wear of the keeper-ring.

9 Claims, 6 Drawing Figures

PATENTED JAN 23 1973 3,712,436

CLUTCH PLATE SPRING WITH PIVOT RINGS

The present invention generally relates to clutches comprising a diaphragm acting between a cover and a pressure-plate, the said diaphragm being rockably mounted on the said cover by means of small pillars fixed to this latter in co-operation with supporting means provided for the diaphragm and extending over all or part of two circumferences enclosing the whole of the pillars, one of the said supporting means being placed between the diaphragm and the cover, while the other supporting means is a keeper-ring placed on the other side of the diaphragm, between this latter and the said small pillars.

In operation, the diaphragm only bears alternately on one or the other of its supporting means in each of its two possible positions, corresponding respectively to the engaged and the released states of the clutch, that of the said supporting means against which the diaphragm does not bear being then not subject to any stress and being therefore free to make any relative movement, especially of rotation, with respect to the pillars.

In the absence of special precautions, this results especially in rapid wear of the keeper-ring constituting one of these supporting means; it also results in wear of the pillars which, for this reason, must usually be given a prior hardening treatment in order to prevent this wear.

In order to prevent this keeper-ring from being able to travel with respect to the pillars, and therefore to become worn, it has already been proposed to shape it in such manner as to fix it to some extent on the pillars, especially by corrugation in a plane, axial corrugations, skewing or ovalization round the pillars.

However, these constructions have only a doubtful effectiveness, generally have a high production cost, and complicate the assembly of the clutch.

The present invention has especially for its object a diaphragm clutch, of the type referred to above, equipped with a keeper-ring free from any such disadvantage. It also has for its object a keeper-ring of this kind.

The clutch according to the invention is generally characterized in that the ring in question comprises at least one flattened portion co-operating with the head of a small pillar, the said flattened portion being limited circumferentially by lateral stop flanks which ensure the locking of the ring against rotation.

Flattened portions of this kind have the advantage that they increase the contact surface of each pillar with the ring and they therefore reduce the wear caused by this contact. It is thus possible to contemplate dispensing with the hardening treatment usually applied to these pillars.

In addition, these flattened portions make it possible to economize space axially in a not-negligible manner.

Finally, the locking of the ring for rotation also assists in minimizing wear.

The characteristic features and advantages of the invention will furthermore be brought out in the description which follows below by way of example, reference being made to the accompanying diagrammatic drawings, in which.

Figure 1:
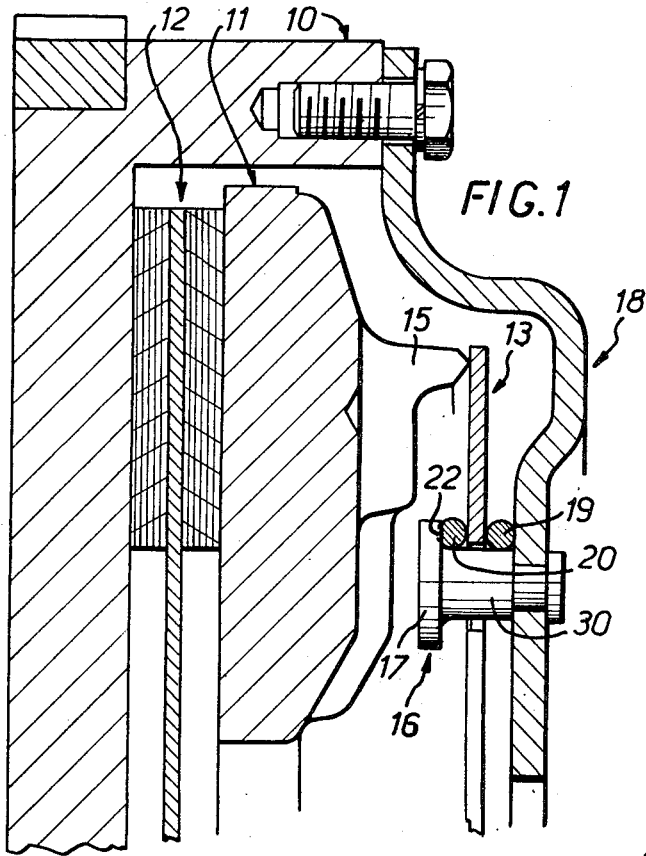
FIG. 1 is a partial view in axial section of a diaphragm of a diaphragm clutch equipped with a keeper-ring according to the invention.

In FIG. 1 there will be recognized a diaphragm clutch of which only the main components have been partially shown.

A diaphragm clutch of this kind comprises a reaction plate or fly-wheel 10, against which a pressure-plate 11 can be applied so as to clamp a friction disc 11 by the action of a diaphragm 13.

This diaphragm 13 is supported peripherally against bosses 15 on the pressure-plate 11, and is coupled by small pillars 16 to a cover 18 fixed peripherally to the reaction-plate 10.

Between the diaphragm 13 and the cover 18 is interposed a first supporting means which, in the example shown, is a keeper-ring 19 surrounding circumferentially the pillars 16.

Between the diaphragm 13 and the pillar 16 is interposed a second supporting means which is a keeper-ring 20 surrounding these pillars 16 circumferentially.

Figure 2:
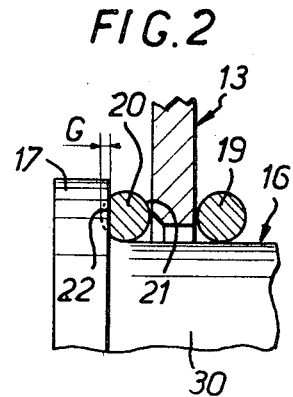
FIG. 2 shows to a larger scale a detail of FIG. 1.

As can be more clearly seen from FIG. 2, this ring 20 co-operates with the diaphragm 13 by a curved surface 21, which permits the rocking movement of the diaphragm 13 during the engagement and release movements of the clutch.

In practice, the ring 20 is for example a round metal wire closed in a loop.

According to the invention, on its surface axially opposite to the round surface 21 described above, the ring 20 is provided with flat portions 22 which each individually co-operate with the head 17 of a pillar 16.

Figure 3:
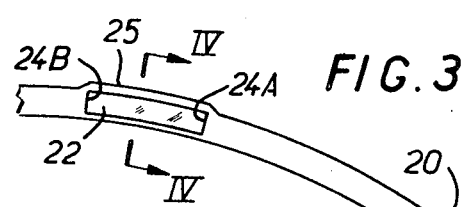
FIG. 3 is a partial view in elevation of a keeper-ring according to the invention.

According to the form of embodiment shown in FIG. 3, these flat portions are discontinuous and are distributed along the periphery of the keeper-ring 11 corresponding to the positions of the pillars 16.

Each of these flat portions 22 is thus limited circumferentially by lateral stop flanks 24A, 24B capable of acting in co-operation with the small pillars 16 to ensure the angular locking for rotation of the keeper-ring 20, as can be seen from FIG. 3 in which a pillar 16 of this kind is shown diagrammatically in chain-dotted lines.

Experience has shown that a ring of this kind is less subject to wear.

In addition, there will be appreciated from FIG. 2 the economy in space provided by such a ring, this saving G being equal to the depth in the axial position of the flat portions 22.

These flat portions 22 may of course be formed by removal of material, but they may also be produced by punching in a press.

Figure 4:
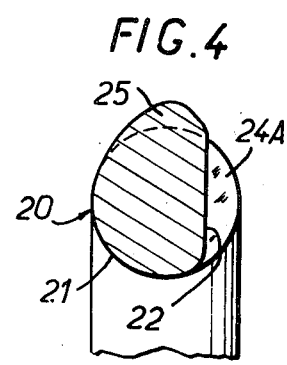
FIG. 4 is a view to a larger scale and in cross-section of this ring, taken along the line IV—IV of FIG. 3.

In such a case, as shown in FIGS. 3 and 4, this stamping operation is preferably carried out in an asymmetrical manner, so that the stamped metal can only flow in the direction of the outer periphery of the ring, leaving unaffected the internal periphery of the ring.

Each flat portion 22 is then edged along its external periphery by a stamping bulge 25.

Figure 5:
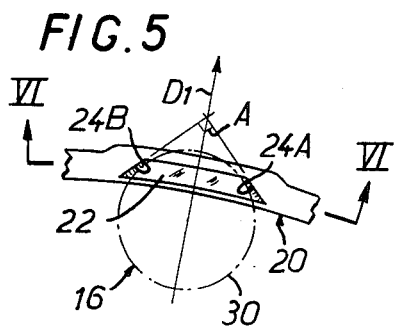
FIG. 5 shows a detail of FIG. 3 and illustrates an alternative form of construction.
Figure 6:
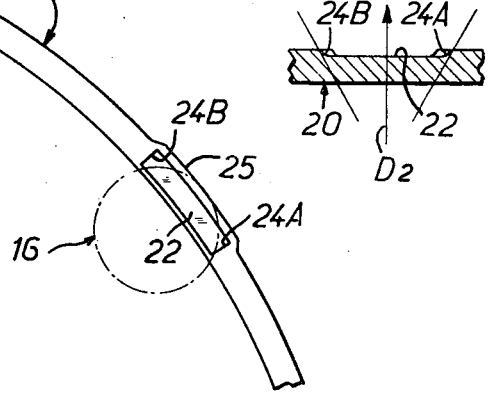
FIG. 6 is a view in cross-section of this alternative form, taken along the line VI—VI of FIG. 5.

According to the alternative form of construction shown in FIGS. 5 and 6, the lateral flanks 24A, 24B of a flat portion 22 converge towards each other in the direction of the exterior of the ring, in a direction D1 parallel to the general plane of this ring. In the example shown, these lateral flanks form with each other an angle A in the neighborhood of 90°.

This arrangement enables a flat portion to fit better over the body 30 of a small pillar 16, the flanks of this flattened portion being preferably substantially tangential to the said body.

Furthermore, but following a direction D2 perpendicular to the general plane of the ring (see FIG. 6 the lateral stop flanks 24A, 24B of a flat portion 22 of this alternative form diverge from each other from this flattened portion to form any desired profile such as a straight line or a coupling fillet, corresponding for example to a relief of the stamping tool.

The invention is of course not limited to the forms of embodiment described and illustrated, but includes all alternative forms of construction and/or of combination of their various parts.

What I claim is:

1. A clutch of the kind comprising a diaphragm acting between a cover and a clamping plate and rockably mounted on said cover by means of a plurality of small pillars fixed on said cover, in co-operation with supporting means extending, at least in part, over two circumferences enclosing all said pillars, one of said supporting means being mounted between the diaphragm and the cover while the other supporting means is a keeper-ring mounted on the other side of said diaphragm, in which said keeper-ring comprises at least one flattened portion adapted to co-operate with the head of a pillar, said flattened portion being limited circumferentially by lateral stop flanks which ensure the locking of said keeper-ring for rotation.

2. A clutch as claimed in claim 1, in which said ring is provided with as many flattened portions as there are pillars.

3. A clutch as claimed in claim 1, in which the lateral stop flanks of each flattened portion of said ring converge towards each other parallel to the plane of said ring and in the direction of the exterior of said ring.

4. A clutch as claimed in claim 3, in which said lateral stop flanks of a flattened portion form with each other an angle in the vicinity of 90°.

5. A clutch as claimed in claim 1, in which said lateral stop flanks of a flattened portion are substantially tangential to the body of the associated small pillar.

6. A clutch as claimed in claim 1, in which said lateral stop flanks of a flattened portion diverge from each other in a direction perpendicular to the plane of said ring, starting from said flattened portion.

7. A diaphragm clutch as claimed in claim 1, in which said flattened portions are formed by a punching operation applied to said keeper-ring in an asymmetric manner, each of said flattened portions then having a stamping bulge along the external periphery of said ring.

8. A diaphragm clutch as claimed in claim 1, in which said keeper-ring co-operates with said diaphragm through the intermediary of a curved surface, said flattened portions being formed on the surface of the ring axially opposite to said curved surface.

9. A keeper-ring for a diaphragm clutch as claimed in claim 1, in which said ring comprises at least one flat portion limited circumferentially by lateral flanks.

* * * * *